United States Patent
Takayama et al.

(10) Patent No.: US 10,078,327 B2
(45) Date of Patent: Sep. 18, 2018

(54) TEACHING SYSTEM OF DUAL-ARM ROBOT AND METHOD OF TEACHING DUAL-ARM ROBOT

(71) Applicant: KAWASAKI JUKOGYO KABUSHIKI KAISHA, Kobe-shi, Hyogo (JP)

(72) Inventors: Yuuki Takayama, Akashi (JP); Masayuki Kamon, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/539,713

(22) PCT Filed: Dec. 25, 2015

(86) PCT No.: PCT/JP2015/006475
§ 371 (c)(1),
(2) Date: Jun. 26, 2017

(87) PCT Pub. No.: WO2016/103729
PCT Pub. Date: Jun. 30, 2016

(65) Prior Publication Data
US 2017/0343998 A1     Nov. 30, 2017

(30) Foreign Application Priority Data

Dec. 26, 2014 (JP) .................................. 2014-266509

(51) Int. Cl.
G05B 19/42      (2006.01)
G05B 19/423     (2006.01)
B25J 9/00       (2006.01)

(52) U.S. Cl.
CPC .......... *G05B 19/423* (2013.01); *B25J 9/0087* (2013.01)

(58) Field of Classification Search
CPC ... B25J 9/1674; B25J 9/06; B25J 9/042; B25J 9/1682; G05B 2219/45083
See application file for complete search history.

(56) References Cited

U.S. PATENT DOCUMENTS 5,783,922 A * 7/1998 Hashimoto .............. B25J 13/02
                                                   318/568.11
2015/0352720 A1* 12/2015 Iizuka .................... B25J 9/1682
                                                   700/245

FOREIGN PATENT DOCUMENTS

CN    101947786 A    1/2011
JP    S60-80575 A    5/1985
(Continued)

OTHER PUBLICATIONS

Feb. 9, 2016 Search Report issued in International Patent Application No. PCT/JP2015/006475.
(Continued)

*Primary Examiner* — Karen Masih
(74) *Attorney, Agent, or Firm* — Oliff PLC (57) ABSTRACT

The purpose is to perform a teaching work of a dual-arm robot instinctively and easily. A dual-arm robot including two arms made of a plurality of links coupled to each other with joint shafts, and two instructing parts provided to tip ends of the two arms, respectively, and configured to indicate coordinate points in space and to be grippable by a teacher, and a control device configured to acquire the coordinate points indicated by the teacher moving the two instructing parts directly and simultaneously with both hands as teaching points, and teach the dual-arm robot operation corresponding to the acquired teaching points.

12 Claims, 6 Drawing Sheets

(56) References Cited

FOREIGN PATENT DOCUMENTS

| | | |
|---|---|---|
| JP | H02-36085 A | 2/1990 |
| JP | H09-85671 A | 3/1997 |
| JP | 2012-157946 A | 8/2012 |
| JP | 2013-043250 A | 3/2013 |
| JP | 2013-059852 A | 4/2013 |
| JP | 2014-217913 A | 11/2014 |
| WO | 2013/035244 A | 3/2013 |
| WO | 2013-192500 A | 12/2013 |

OTHER PUBLICATIONS

Jun. 27, 2017 International Preliminary Report on Patentability issued in International Patent Application No. PCT/JP2015/006475.
Nov. 14, 2016 Office Action issued in Taiwanese Patent Application No. 104144017.

\* cited by examiner

TEACHING SYSTEM OF DUAL-ARM ROBOT AND METHOD OF TEACHING DUAL-ARM ROBOT

TECHNICAL FIELD

The present disclosure relates to a teaching system of a dual-arm robot, and a method of teaching the dual-arm robot.

BACKGROUND ART

Generally, teaching of a robot is performed using a teaching pendant. As for a method of teaching a robot more instinctively, there is direct teaching in which one touches the robot to teach operations (see Patent Documents 1 to 3).

REFERENCE DOCUMENTS OF CONVENTIONAL ART

Patent Documents

Patent Document 1: JP2013-059852A
Patent Document 2: JP2013-043250A
Patent Document 3: JP2012-157946A

DESCRIPTION OF THE DISCLOSURE

Problems to be Solved by the Disclosure

However, in the conventional direct teaching of the robot, exclusive sensors for teaching, such as a joystick and/or a force sensor, need to be used. Thus, a delay occurs in robot operation during the teaching, thereby one feels a sense of discomfort. Furthermore, when a rapid operation is inputted, there is a problem that the robot may perform an abrupt change operation, causing danger, etc.

Meanwhile, in recent years, in a flow operation line etc., dual-arm robots of about a human size tend to work instead of workers. Generally, there is a problem that teaching of a dual-arm robot is complicated because routes of two arms which avoid interferences therebetween must be found out etc. Therefore, the purpose of the present disclosure is to allow one to perform a teaching work of a dual-arm robot instinctively and easily.

SUMMARY OF THE DISCLOSURE

According to one aspect of the present disclosure, a teaching system of a dual-arm robot includes a dual-arm robot including two arms comprised of a plurality of links coupled to each other with joint shafts, and two instructing parts provided to tip ends of the two arms, respectively, and configured to indicate coordinate points in space and to be grippable by a teacher, and a control device configured to acquire the coordinate points indicated by the teacher moving the two instructing parts directly and simultaneously with both hands as teaching points, and teach the dual-arm robot operation corresponding to the acquired teaching points.

According to this configuration, the teaching is achieved by the teacher gripping both of the arm tip ends (instructing parts) with both hands and moving the arms directly and simultaneously. Thus, the route in which the arms do not interfere with each other is instinctively taught to the dual-arm robot. Furthermore, exclusive sensors etc. required for the conventional direct teaching are no longer necessary, and the system is configured at low cost. Each of the arms may include servo motors that drive the joint shafts, respectively, and the control device may acquire the teaching points in a state where the servo motors are turned off and brakes are disengaged.

According to this configuration, by using the backdrive of each arm, the teacher becomes easier to move both the arms and the teaching operation becomes easier. Moreover, since the servo motors are turned off and the brakes are disengaged, a possibility of the robot going out of control is eliminated completely, and safety is assured. For example, the servo motor may be a direct drive motor, or may be provided with a DC motor and a transmission mechanism with a low reduction ratio. Thereby, the backdrive of the arm suitably acts.

The control device may further include a first operational key configured to turn off the servo motors of each of the arms and disengage the brakes, and a second operational key configured to register the coordinate points indicated by the instructing parts of the respective arms as the teaching points.

According to this configuration, the teacher is able to start the teaching operation of the arm by the first operational key and register the teaching point at an arbitrary point by the second operational key. Thereby, the teaching operation becomes easier.

The first operational key and the second operational key may be provided to the respective arms.

According to this configuration, since the teacher becomes easier to perform the key operation with both hands, the teaching operation becomes easier. The first operational key and the second operational key may be provided to each of the instructing parts or near each of the instructing parts.

According to this configuration, the key operation becomes easier and the teaching point can be taught suitably.

Each of the arms may further include a first link supported by the robot main body so as to be rotatable centering on a vertical rotational axis of a first joint shaft that is used as a fulcrum, a second link supported by the first link so as to be rotatable centering on a horizontal rotational axis of a second joint shaft that is used as a fulcrum, and a self-weight compensation mechanism configured to come the second link to rest with respect to the first link by applying a force in the opposite direction of gravity to the second link.

According to this configuration, since self-weight loads of the arms which act on the teacher during the teaching are reduced, the teaching becomes easier. For example, the self-weight compensation mechanism may be comprised of a tension spring, a balance weight or an auxiliary link.

The robot main body may include a support having branched parts of which tip ends are spaced apart from each other and branched to the left and to right, and the first links including base ends of the two arms may be supported by the branched parts of the support so as to be rotatable centering on rotational axes of the first joint shafts that are used as fulcrums, respectively.

According to this configuration, since the support tip end of the robot main body is branched, a space is produced between the first joint shafts of the two arms, thereby there is nothing that interrupts the teacher's view Therefore, the teacher's view is expanded and the teaching operation becomes easier.

The first rotational axis of the first joint shaft may be parallel to a center axis of the support. The system may further include second links and self-weight compensation mechanisms. The first links may be supported by the branched parts of the support in a suspended state so as to be horizontally rotatable centering on the first rotational axis of the first joint shaft. The second link may be supported by the first link so as to be vertically rotatable centering on the second joint shaft having a rotational axis perpendicular to the center axis of the support. The self-weight compensation mechanism may come the second link to rest with respect to the first link at an angle of substantially 90 degrees with respect to the rotational axis of the first link by applying a force in the opposite direction of gravity to the second link.

According to this configuration, since the second links which are maintained at the angle substantially horizontal with respect to the first links of the arms by the self-weight compensation mechanisms rotate horizontally together with the first links, spaces are produced below the first links and the second links, and the teacher is able to insert both shoulders into the spaces. Thus, the shaft joint positions of the arms of the robot substantially coincide with the shaft joint positions of the teacher's shoulders, and the teaching operation becomes easier.

According to another aspect of the present disclosure, a method of teaching a dual-arm robot is provided, the dual-arm robot including two arms comprised of a plurality of links coupled to each other with joint shafts, and two instructing parts provided to tip ends of the two arms, respectively, and configured to indicate coordinate points in space and to be grippable by a teacher. The method includes acquiring the coordinate points indicated by the teacher moving the two instructing parts directly and simultaneously with both hands as teaching points, and teaching the dual-arm robot operation corresponding to the acquired teaching points.

Effect of the Disclosure

According to the present disclosure, the teaching work of the dual-arm robot is performable instinctively and easily.

The purpose described above, other purposes, features, and advantages of the present disclosure will be made clear from the following detailed description of a suitable embodiment with reference to the accompanying drawings.

MODE FOR CARRYING OUT THE DISCLOSURE

Hereinafter, one embodiment according to the present disclosure is described with reference to the accompanying drawings. Below, the same reference characters are assigned to the same or corresponding components throughout the drawings to omit redundant description.

Figure 1:
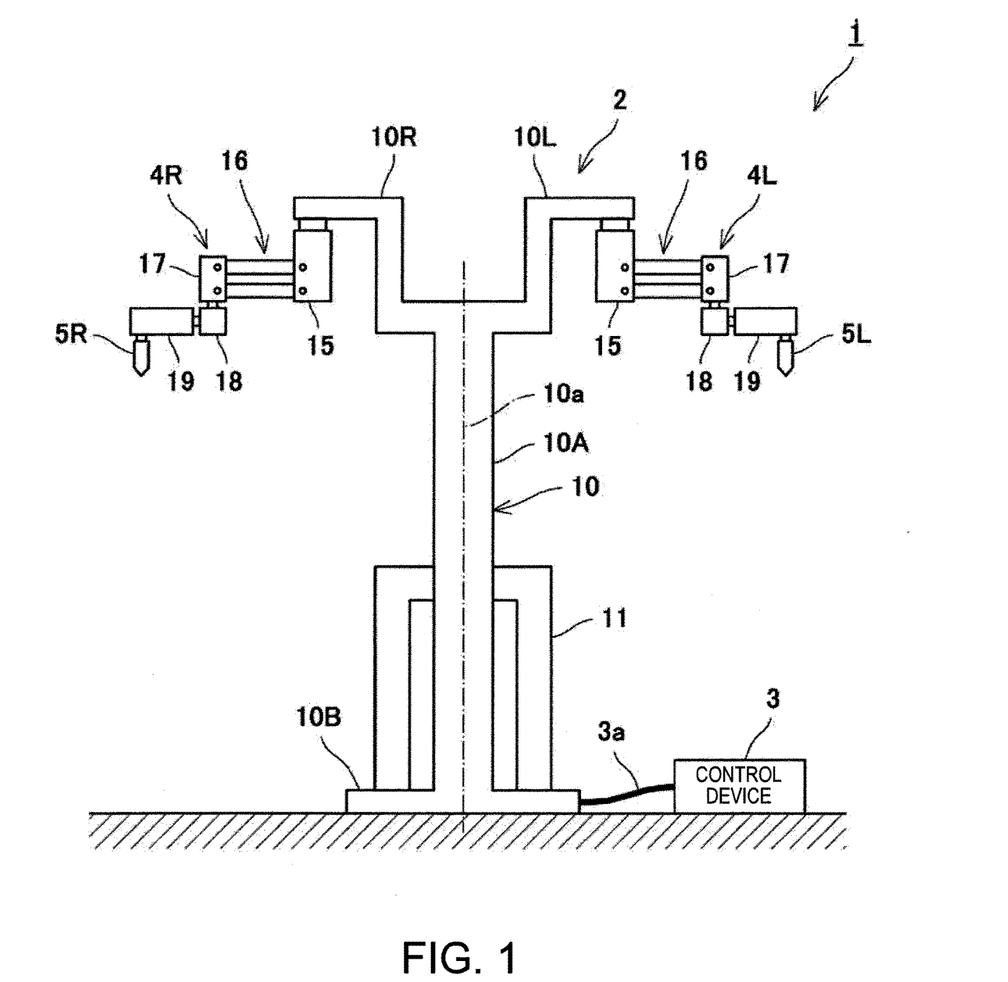
FIG. 1 is a front view schematically illustrating a configuration of a teaching system of a dual-arm robot according to this embodiment.

FIG. 1 is a front view schematically illustrating a configuration of a teaching system of a dual-arm robot according to one embodiment. As illustrated in FIG. 1, the robot teaching system 1 includes a dual-arm robot 2, and a control device 3 connected with the dual-arm robot 2 through a control line 3a. For this drawing, the forward direction of the dual-arm robot 2 coincide with a direction in which the drawing surface faces.

[Dual-Arm Robot]

The dual-arm robot 2 includes a robot main body 10, a right arm 4R provided to a right side of the robot main body 10, and a left arm 4L provided to a left side of the robot main body 10.

The robot main body 10 includes a support 10A, and a pedestal 10B which is installed on a floor surface and supports the support 10A. The support 10A has, at a tip end thereof, branched parts 10R and 10L that are spaced apart from each other and are respectively branched to the left and right. A stool 11 for a teacher is disposed behind the robot main body 10. The teacher sits down on the stool 11 and performs a teaching work of the dual-arm robot 2.

The right arm 4R is comprised of a plurality of links which are coupled to each other with joint shafts. An instructing part 5R is provided to a tip end of the right arm 4R. The instructing part 5R indicates a coordinate point in space, and is structured to be grippable by the teacher.

The left arm 4L is comprised of a plurality of links which are coupled to each other with joint shafts. An instructing part 5L is provided to a tip end of the left arm 4L. The instructing part 5L indicates a coordinate point in space, and is structure to be grippable by the teacher. In this embodiment, the left and right arms 4L and 4R are structured symmetrically with respect to a center axis 10a of the support 10A of the robot main body 10.

Figure 2:
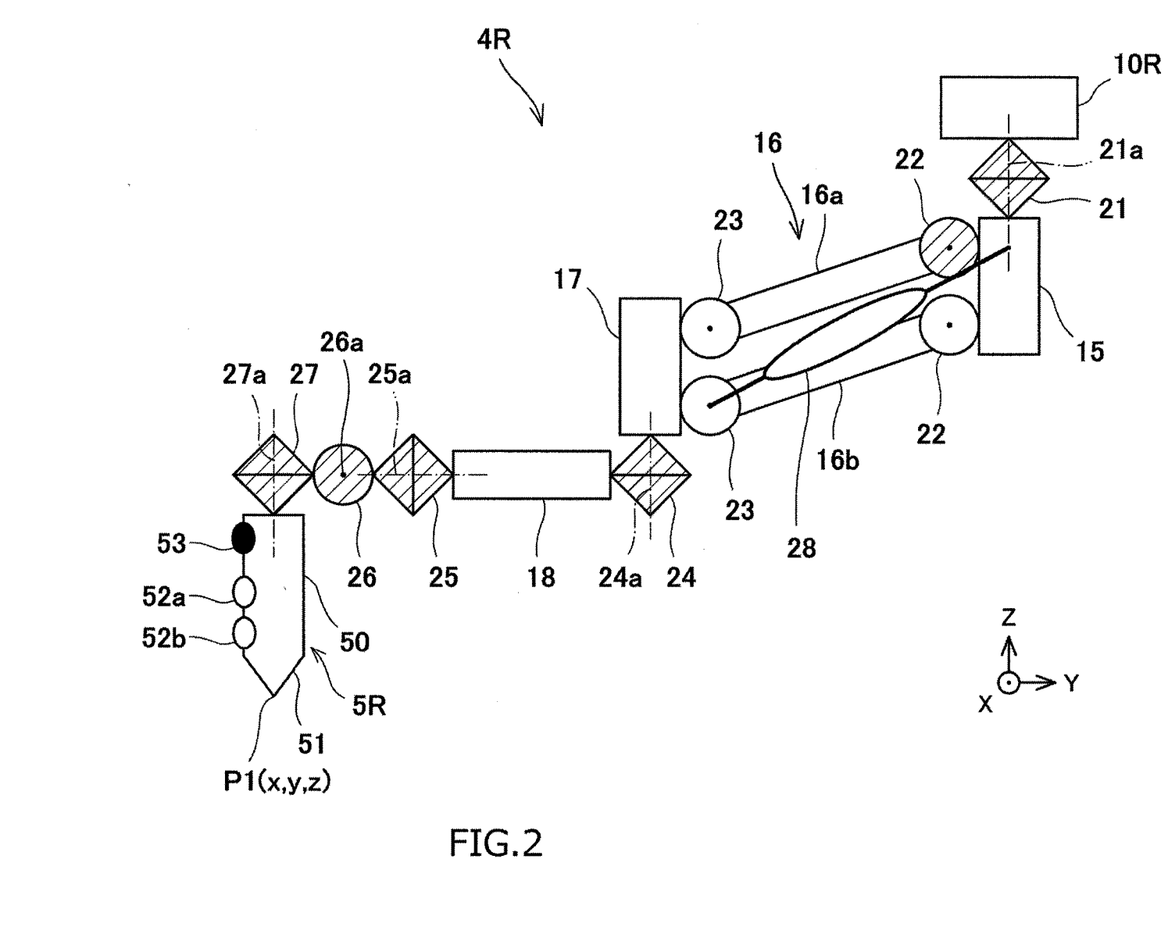
FIG. 2 is a view schematically illustrating a joint structure of a right arm of the dual-arm robot of FIG. 1.

Below, a particular configuration of the right arm 4R is described. FIG. 2 is a view schematically illustrating a joint structure of the right arm 4R. As illustrated in FIG. 2, the right arm 4R is comprised of four kinds of links (15-18) coupled to each other with seven joint shafts (21-27), and the instructing part 5R is provided to the tip end thereof.

A servo motor for drive, a brake which brakes rotation of the servo motor, and a position sensor which detects a rotational angular position of the servo motor are provided corresponding to each of a first joint shaft 21, second joint shafts 22, a fourth joint shaft 24, a fifth joint shaft 25, a sixth joint shaft 26, and a seventh joint shaft 27, respectively (none of them is illustrated). In this drawing, drive shafts among the plurality of joint shafts are indicated by oblique lines. In this embodiment, the servo motor may be a direct drive motor, or may be provided with a DC motor and a transmission mechanism with a low reduction ratio. The position sensor is an encoder, for example. The brake is, for example, an excitation-actuated electromagnetic brake which is disengaged when excited by electric power supply, and on the other hand, is engaged when not excited.

The first link 15 is coupled at one longitudinal end thereof to the branched part 10R of the support 10A (FIG. 1) through the first joint shaft 21, and is coupled at the other longitudinal end to the second link 16 through the pair of second joint shafts 22. The first link 15 is supported by the branched part 10R of the support, in a suspended state in which it is horizontally rotatable centering on a first rotational axis 21a of the first joint shaft 21. Here, the first rotational axis 21a of the first joint shaft 21 is parallel to the center axis 10a of the support 10A (FIG. 1).

The second link 16 is comprised of a pair of second link members 16a and 16b parallel to each other. One longitudinal ends of the pair of second link members 16a and 16b are coupled to the first link 15 through the pair of second joint shafts 22, respectively, and the other longitudinal ends of the pair of second link members 16a and 16b are coupled to a third link 17 through a pair of third joint shafts 23, respectively. The second link 16 is supported by the first link 15 so as to be vertically rotatable centering on the second joint shafts 22 which have rotational axes perpendicular to the center axis 10a of the support 10A (FIG. 1). Moreover, as for the third link 17, one longitudinal end is coupled to the second link 16 through the pair of third joint shafts 23.

Therefore, the pair of mutually-parallel second link members 16a and 16b which constitute the second link 16, the pair of second joint shafts 22, and the pair of third joint shafts 23 constitute a parallel-link mechanism. Only one of the pair of second joint shafts 22 is a drive shaft, and the other of the pair of second joint shafts 22 and the pair of third joint shafts 23 are driven shafts.

Therefore, the third link 17 is uniquely determined when postures of the first link 15 and the second link 16 are fixed. Here, since the pair of second joint shafts 22 and the pair of third joint shafts 33 are vertically arranged, respectively, the third link 17 moves in a vertical plane defined by the parallel link, while maintaining the uniquely-determined posture. Moreover, the right arm 4R includes a self-weight compensation mechanism 28 which comes the second link 16 to rest with respect to the first link 15 by applying a force in the opposite direction of gravity to the second link 16. Although the self-weight compensation mechanism 28 is comprised of a tension spring in this embodiment, it may be comprised of a balance weight or an auxiliary link. One end of the self-weight compensation mechanism 28 is connected to the first link 15, and the other end is connected to the third joint shaft. Thus, the second link 16 is capable of coming to rest with respect to the first link 15 at a substantially 90 degrees with respect to the first rotational axis 21a which is a rotational axis of the first link.

The other longitudinal end of the third link 17 is coupled to the fourth link 18 through the fourth joint shaft 24.

The fourth link 18 is coupled at one longitudinal end to the third link 17 through the fourth joint shaft 24. The fourth link 18 is supported by the third link 17 so as to be horizontally rotatable centering on a fourth rotational axis 24a of the fourth joint shaft 24. Here, the fourth rotational axis 24a of the fourth joint shaft 24 is parallel to the first rotational axis 21a of the first joint shaft 21.

The other longitudinal end of the fourth link 18 is coupled to the instructing part 5R through the fifth joint shaft 25, the sixth joint shaft 26, and the seventh joint shaft 27.

The sixth joint shaft 26 is supported by the fourth link 18 so as to be rotatable centering on a fifth rotational axis 25a of the fifth joint shaft 25. Here, the fifth rotational axis 25a of the fifth joint shaft 25 is perpendicular to the first rotational axis 21a and the fourth rotational axis 24a. That is, here, the fifth rotational axis 25a is a horizontal rotational axis.

The instructing part 5R is coupled at one longitudinal end to the seventh joint shaft. The instructing part 5R is supported by the sixth joint shaft 26 so as to be rotatable centering on a seventh rotational axis 27a of the seventh joint shaft 27. Here, the rotational axis 26a of the sixth joint shaft is perpendicular to the fifth rotational axis 25a, and the rotational axis 27a of the seventh joint shaft 27 is perpendicular to the sixth rotational axis 26a.

Therefore, the instructing part 5R is rotatable with respect to the fourth link 18 in any direction, and is capable of taking any posture.

The instructing part 5R is comprised of a bar-shaped grip part 50 and a tip-end part 51 which indicates the coordinate point in space. The grip part 50 is provided with operation permitting buttons 52a and 52b, and a position registering button 53. They are not limited to the buttons but may be other operational keys.

The operation permitting buttons 52a and 52b are operational buttons for starting a teaching operation. The operation permitting button 52a is a button for turning off all the servo motors of the first to sixth joint shafts 21-26 and disengaging the brakes. The operation permitting button 52b is a button for turning off the servo motors of three shafts of the first to third joint shafts 21-23 on the main body 10 side and disengaging the brakes. By using the operation permitting button 52b, the arm position is adjustable while the posture of the hand (the instructing parts 5R and 5L) of the arm is fixed. Moreover, by pressing both the operation permitting buttons 52a and 52b, the servo motors of three shafts of the fourth to sixth joint shafts 24-26 on the tip-end side of the arm are turned off and the brake are disengaged. Thus, the posture of the hand (the instructing parts 5R and 5L) is adjustable, while the arm position is fixed. Moreover, the operation permitting button 52b may be provided to the fourth link 18 or the fifth link 19.

The position registering button 53 is an operational button for registering the coordinate point indicated by the instructing part 5R as a teaching point. These buttons may be provided near the instructing part 5R. Thus, since the teacher is easy to operate the buttons with both hands, the teaching operation becomes easier.

Here, the coordinate point in space is calculated as follows. For example, in a reference coordinate system (hereinafter, referred to as "the base coordinate system") for the right arm 4R of the dual-arm robot 2, as illustrated in FIG. 2, an intersection between a bottom surface of the branched part 10R of the support and the first rotational axis 21a of the first joint shaft 21 is an origin, the first rotational axis 21a of the first joint shaft 21 is Z-axis, an arbitrary axis perpendicular to the Z-axis is X-axis, and an axis perpendicular to the Z-axis and the X-axis is Y-axis. Based on the base coordinate system, by storing beforehand angular positions of the first to sixth joint shafts 21-26, dimensions of the links 15-19 and the instructing part 5R which constitute the right arm 4R, etc., a coordinate point P1 (x, y, z) in the three-dimensional space which is indicated by the tip-end part 51 of the instructing part 5R is calculatable.

[Control Device]

Figure 3:
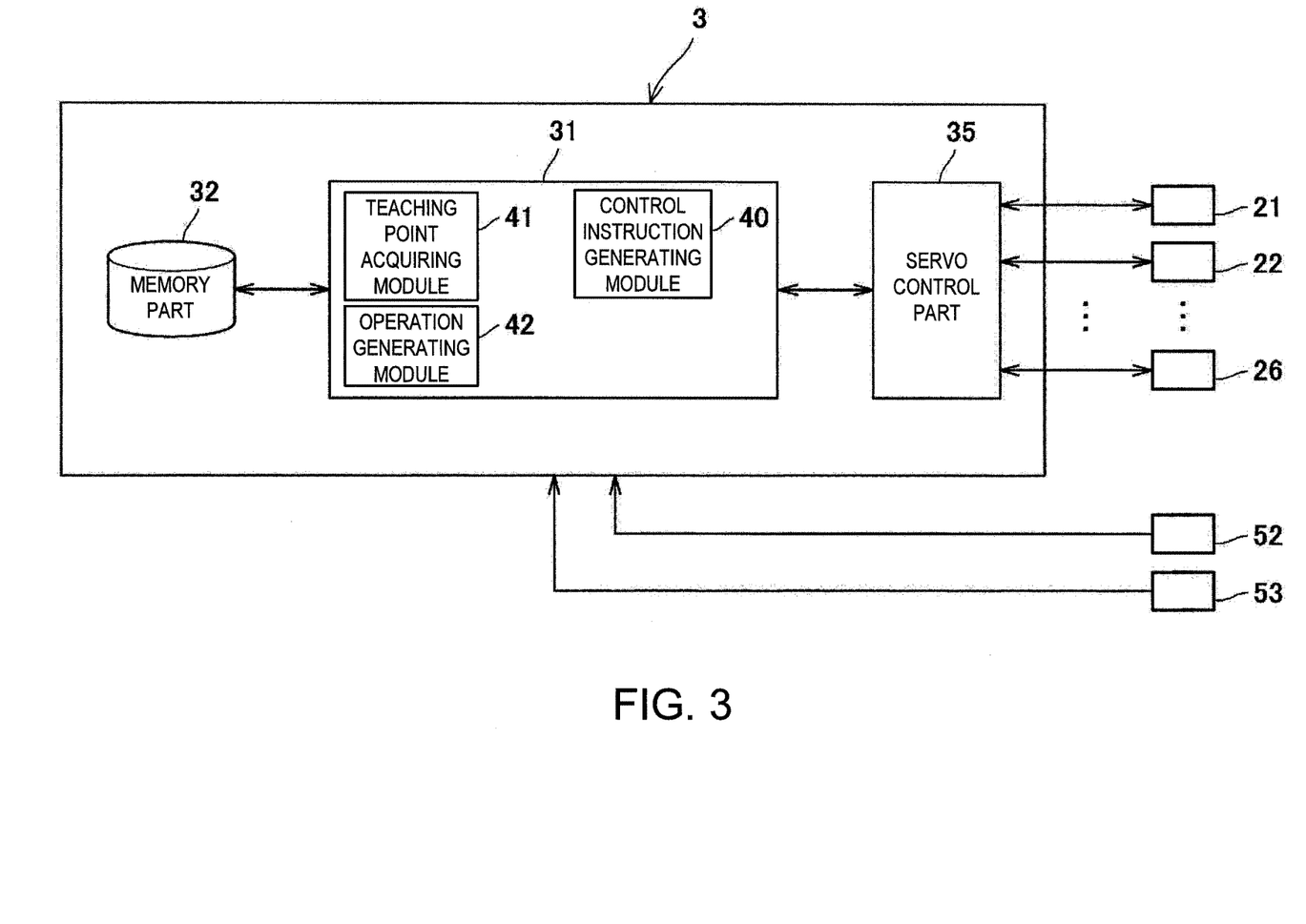
FIG. 3 is a block diagram illustrating a configuration of a control device of FIG. 1.

FIG. 3 is a block diagram illustrating a configuration of the control device 3. As illustrated in FIG. 3, the control device 3 includes an operation part 31, a memory part 32, and a servo control part 35. The control device 3 is, for example, a robot controller provided with a computer, such as a micro controller. In this embodiment, the robot controller has a teaching function of the dual-arm robot 2. The control device 3 is not limited to a single device, but may be comprised of a plurality of devices including the robot controller. The control device 3 is connected with the operation permitting buttons 52a and 52b and the position registering button 53 through a communication interface (not illustrated), and receives a command signal from each operational key.

The memory part 32 stores information, such as a basic program as the robot controller, a teaching program of the robot, dimensions of the links, teaching points, and teaching operations.

The operation part 31 performs calculation processing for a robot control. The operation part 31 is configured to achieve each functional block including a control instruction generating module 40, a teaching point acquiring module 41, and an operation generating module 42 (operate as each functional block). The control instruction generating module 40 generates a control instruction of the robot 2, and outputs it to the servo control part 35. The teaching point acquiring module 41 calculates two coordinate points in the space indicated by the two instructing parts 5R and 5L of the right arm 4R and the left arm 4L to acquire them as the teaching points, respectively. The operation generating module 42 generates operations (hereinafter, simply referred to as "the operations") of the two arms, which correspond to the teaching points acquired by the teaching point acquiring module 41.

The servo control part 35 is configured to control operation of each shaft of the joint shafts 21-26 of the robot 2 based on the control instruction generated by the operation part 31.

With the above configuration, when the control device 3 receives an operation permitting signal from at least one of the operation permitting buttons 52a and 52b, the control instruction generating module 40 generates a control instruction based on the operation permitting signal(s), and then outputs the operation permitting signal(s) to the servo control part 35. The servo control part 35 controls into a state where the servo motors of the joint shafts are turned off based on the control instruction, and the brakes are disengaged. Furthermore, when the control device 3 receives a position registering signal from the position registering button 53, the teaching point acquiring module 41 calculates the coordinate points indicated by the instructing parts 5R and 5L, and registers them as the teaching point, respectively. Then, the operation generating module 42 generates operation corresponding to the teaching points acquired by the teaching point acquiring module 41. That is, a sequence program of the robot operation is generated.

Figure 4:
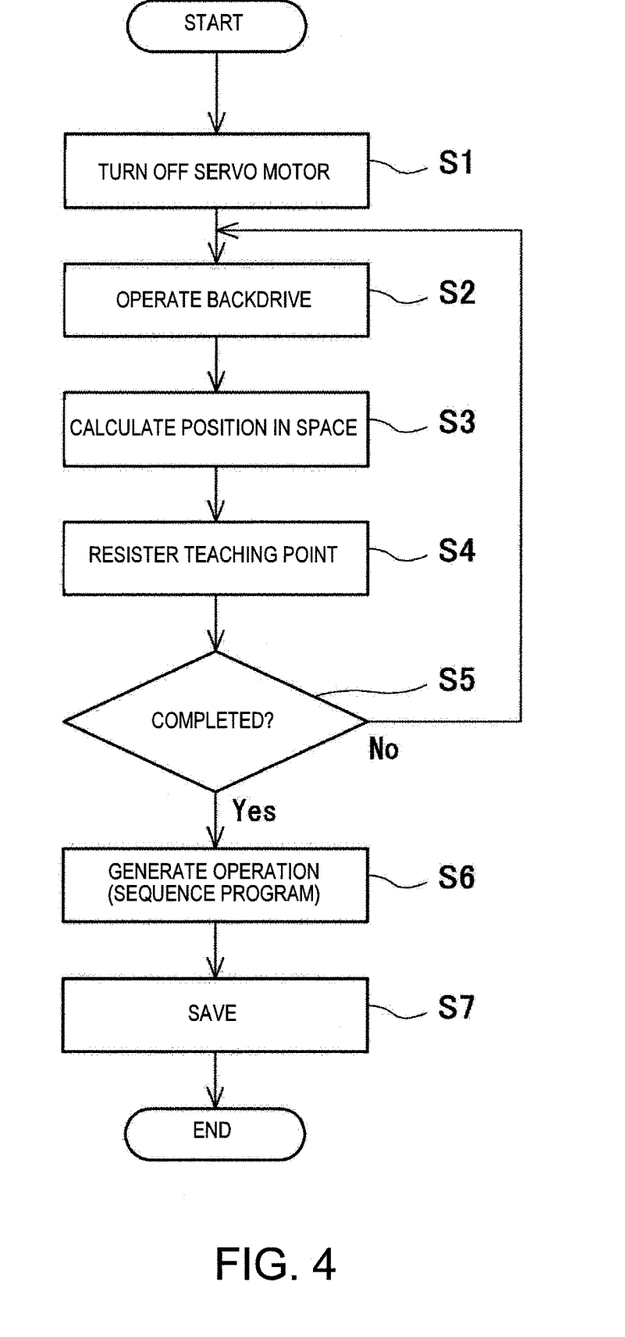
FIG. 4 is a flowchart illustrating one example of procedures of a method of teaching the dual-arm robot of FIG. 1.
Figure 5:
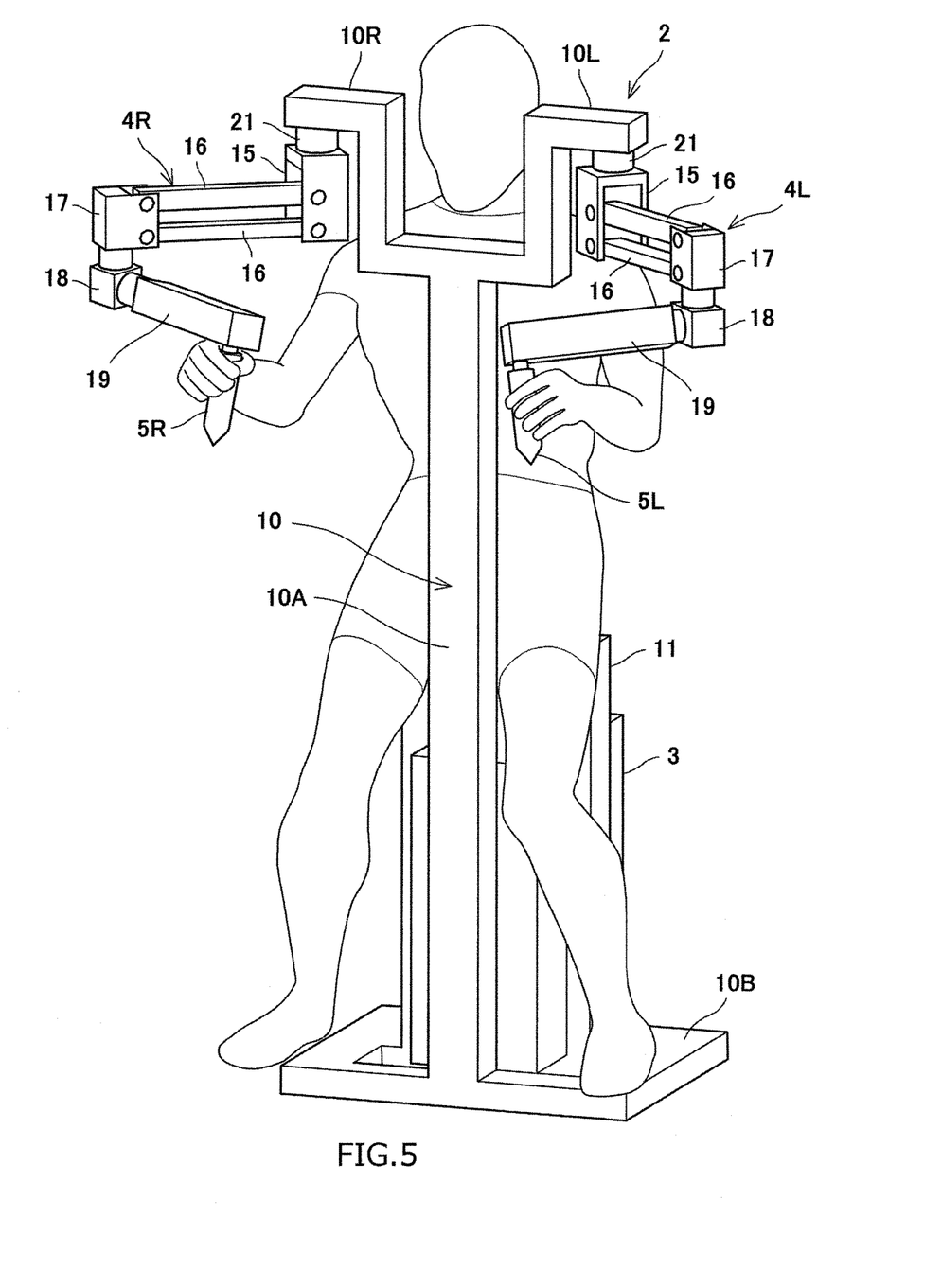
FIG. 5 is a perspective view illustrating a situation in which a teacher teaches the dual-arm robot of FIG. 1, when viewed obliquely from front.
Figure 6:
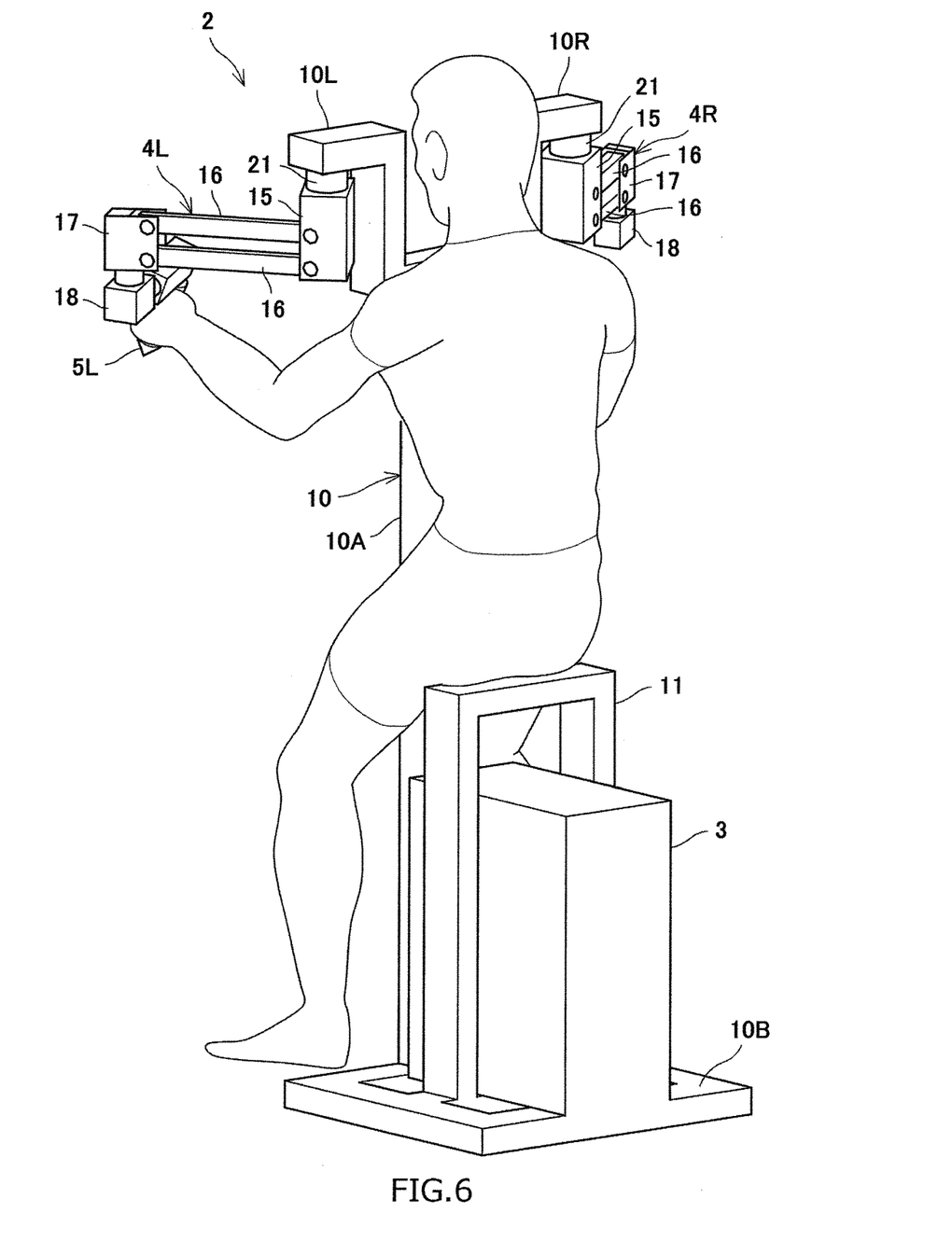
FIG. 6 is a perspective view illustrating the situation in which the teacher teaches the dual-arm robot of FIG. 1, when viewed obliquely from rear.

Next, the method of teaching the dual-arm robot 2 is described using FIGS. 4 to 6. FIG. 4 is a flowchart illustrating one example of procedures of the method of teaching the dual-arm robot 2. FIGS. 5 and 6 are perspective views illustrating a situation in which the teacher teaches the dual-arm robot 2, when viewed obliquely from front and rear.

As illustrated in FIGS. 5 and 6, the teacher grips the grip parts 50 of the instructing parts 5L and 5R of the respective arms with both left-and-right hands, sits down on the stool 11, and then performs a teaching work of the dual-arm robot 2. Here, the control device 3 is accommodated under the stool 11 in order to save the space. Moreover, as illustrated in FIG. 5, since the tip end of the support 10A of the robot main body 10 is branched to the branched parts 10L and 10R, a space is produced between the first joint shaft 21 of the arm 4R and the first joint shaft 21 of the arm 4L, thereby there is nothing that interrupts the teacher's view. Therefore, the teacher's view is expanded and the teaching work becomes easier.

Then, the teacher is able to start the teaching work by pressing either one of the operation permitting buttons 52a and 52b. The control device 3 turns off the servo motors of the corresponding shafts of each arm, and disengages the brakes (Step S1). Thus, the teacher becomes easier to move both the arms by using the backdrive of each arm. Moreover, since the servo motors are turned off and the brakes are disengaged, a possibility of the robot going out of control is eliminated completely, and safety is assured. Moreover, since self-weight loads of the arms which act on the teacher are reduced by the self-weight compensation mechanisms 28 (see FIG. 2), the teaching becomes easier.

Next, the teacher moves the two instructing parts 5R and 5L directly and simultaneously with both hands by using the backdrive of the arms (Step S2). As illustrated in FIGS. 5 and 6, since the second links 16 which are maintained at the angle substantially horizontal with respect to the first links 15 of the arms 4R and 4L by the self-weight compensation mechanisms 28 (see FIG. 2) rotate horizontally together with the first links 15, spaces are produced below the first links 15 and the second links 16, and the teacher is able to insert both shoulders into the spaces. Thus, the shaft joint positions of the two arms 4R and 4L of the dual-arm robot 2 substantially coincide with the shaft joint positions of the teacher's shoulders, and the teaching operation becomes easier.

Next, the control device 3 calculates the positions in the space of the instructing parts 5R and 5L based on the backdrive operation of the arms (Step S3).

Next, when the teacher presses the position registering buttons 53 of the instructing parts 5R and 5L at arbitrary points, the control device 3 registers the coordinate points indicated by the instructing parts 5R and 5L as the teaching points (Step S4). Here, when the position registering button 53 of either one of the instructing parts 5R and 5L is pressed, the teaching points of the two arms 4R and 4L are registered simultaneously. Thus, the teaching points of the two arms 4R and 4L are registered synchronously.

The teacher repeats the steps S2-S4 until teaching points required for the teaching operation are registered (Step S5). When the registration of the teaching points is completed, the control device 3 generates operation (the sequence program of the robot operation) corresponding to the teaching points (Step S6), and saves the teaching operation (locus of operation) (Step S7) and ends. Thus, since the teaching work is completed only by the operation on the arm side, the teacher does not need to operate other user interfaces (the robot controller, PC, etc.) during the work.

Therefore, according to this embodiment, the coordinate points indicated by the teacher moving the two instructing parts 5R and 5L directly and simultaneously with both hands are acquired as the teaching points, and the operation corresponding to the acquired teaching points is taught to the dual-arm robot 2. Thus, the route in which the two arms do not interfere with each other is instinctively taught to the dual-arm robot 2. Furthermore, exclusive sensors etc. required for the conventional direct teaching are no longer necessary, and the system is configured at low cost, Moreover, the taught robot arm operation substantially coincides with the operation of human arms. As a result, an administrator of a production site is understandable at a glance of what kind of work the robot is performing and a progress of the work.

Note that, in this embodiment, although the operation permitting button 52 and the position registering button 53 are provided to the grip part 50 of the instructing parts 5R and 5L, or near the instructing parts 5R and 5L of the respective arms, they may be disposed on the floor other than on the robot. The arms may be moved with both hands, while performing key operations with feet.

It is apparent for a person skilled in the art that many improvements and other embodiments of the present disclosure are possible based on the description described above. Therefore, the description described above is to be interpreted only as illustration, and it is provided in order to teach a person skilled in the art the best mode which implements the present disclosure. Details of one or both of the structure and the function can substantially be changed without departing from the spirit of the present disclosure.

INDUSTRIAL APPLICABILITY

The present disclosure is useful for instructing operation of the dual-arm robot.

DESCRIPTION OF REFERENCE CHARACTERS

1 Robot Teaching System
2 Dual-arm Robot
3 Control Device
4R, 4L Right Arm, Left Arm
5R, 5L Instructing Part (Right), Instructing Part (Left)
10 Robot Main Body
10A Support
10B Pedestal
10R, 10L Branched Part (Right), Branched Part (Left)
11 Stool
15-18 First to Fourth Links
21-27 First to Seventh Joint Shafts
28 Self-weight Compensation Mechanism
31 Operation Part
32 Memory Part
35 Servo Control Part
40 Control Instruction Generating Module
41 Teaching Point Acquiring Module
42 Operation Generating Module
50 Grip Part
51 Tip-end Part
52a, 52b Operation Permitting Button (First Operational Key)
53 Position Registering Button (Second Operational Key)

What is claimed is:

1. A teaching system of a dual-arm robot, comprising:
a dual-arm robot including a robot main body having two branched parts extending in opposite directions of each other and two arms, each of the two arms being connected to a corresponding one of the two branch parts, each of the two arms including:
a plurality of links coupled to each other with joint shafts; and
an instructing part provided to a tip end of each of the two arms, and configured to indicate coordinate points in space and grippable by a user positioned between the two branched parts; and
a control device configured to:
acquire the coordinate points indicated by the user when the user moves each of the instructing parts directly and simultaneously with both hands, the movement of the user corresponding to teaching points; and
teach the dual-arm robot an operation corresponding to the acquired teaching points.

2. The teaching system of claim 1, wherein:
each of the two arms includes:
servo motors that drive the joint shafts, and
brakes that brake rotation of the servo motors, respectively, and
the control device acquires the teaching points when the servo motors are turned off and the brakes are disengaged.

3. The teaching system of claim 2, wherein the control device further includes:
a first operational key configured to turn off the servo motors of each of the two arms and disengage the brakes, and
a second operational key configured to register the coordinate points indicated by the instructing parts of each of the two arms as the teaching points.

4. The teaching system of claim 3, wherein the first operational key and the second operational key are respectively provided to each of the two arms.

5. The teaching system of claim 4, wherein the first operational key and the second operational key are provided to each of the instructing parts or near each of the instructing parts.

6. The teaching system of claim 1, wherein each of the two arms further includes:
a first link supported by a corresponding branch part so as to be rotatable centering on a vertical rotational axis of a first joint shaft;
a second link supported by the first link so as to be rotatable centering on a horizontal rotational axis of a second joint shaft; and
a self-weight compensation mechanism configured apply a force to the second link in an opposite direction of gravity such that the second link is biased to a suspended position.

7. The teaching system of claim 6, wherein,
the robot main body includes a support having a vertical center axis, and
the two branched parts are spaced apart from each other and extend from an end of the support.

8. The teaching system of claim 7, wherein,
the first rotational axis of the first joint shaft is parallel to the vertical center axis of the support,
the first links are supported by the branched parts of the support in a suspended state so as to be horizontally rotatable,
the second link is supported by the first link so as to be vertically rotatable around the second joint shaft, the second joint shaft having a rotational axis perpendicular to the center axis of the support, and
the suspended position of the second link is substantially 90 degrees with respect to the rotational axis of the first link.

9. A method of teaching a dual-arm robot, the dual-arm robot including a robot main body having two branched parts extending in opposite directions of each other and two arms, each of the two arms being connected to a corresponding one of the two branch parts, each of the two arms including: (i) a plurality of links coupled to each other with joint shafts, and (ii) an instructing part provided to a tip end of each of the two arms, and configured to indicate coordinate points in space and be grippable by a user positioned between the two branched parts, the method comprising:
acquiring the coordinate points indicated by the user when the user moves each of the instructing parts directly and simultaneously with both hands, the movement of the user corresponding to teaching points; and
teaching the dual-arm robot an operation corresponding to the acquired teaching points.

10. A teaching system of a dual-arm robot, comprising:
a dual-arm robot including a robot main body having two branched parts and two arms, each of the two arms connected to a corresponding branch part, each of the two arms including:
  a plurality of links coupled to each other with joint shafts; and
  an instructing part provided to a tip end of each of the two arms, and configured to indicate coordinate points in space and be grippable by a user; and
a first link supported by a corresponding branch part so as to be rotatable centering on a vertical rotational axis of a first joint shaft;
a second link supported by the first link so as to be rotatable centering on a horizontal rotational axis of a second joint shaft; and
a self-weight compensation mechanism configured to apply a force to the second link in the opposite direction of gravity such that the second link is biased to a suspended position;
a control device configured to:
  acquire the coordinate points indicated by the user when the user moves each of the instructing parts directly and simultaneously with both hands, the user movement corresponding to teaching points; and
  teach the dual-arm robot an operation corresponding to the acquired teaching points.

11. The teaching system of claim 10, wherein, the robot main body includes a support having a vertical center axis, the two branched parts extending from an end of the support.

12. The teaching system of claim 10, wherein,
the first rotational axis of the first joint shaft is parallel to the vertical center axis of the support,
the first links are supported by the branched parts of the support in a suspended state so as to be horizontally rotatable,
the second link is supported by the first link so as to be vertically rotatable around the second joint shaft, the second joint shaft having a rotational axis perpendicular to the center axis of the support, and
the suspended position of the second link is substantially 90 degrees with respect to the rotational axis of the first link.

* * * * *